F. CUTTING AND B. WASHINGTON.
ALTERNATING CURRENT GENERATOR.
APPLICATION FILED JUNE 26, 1918.
1,435,813.
Patented Nov. 14, 1922.
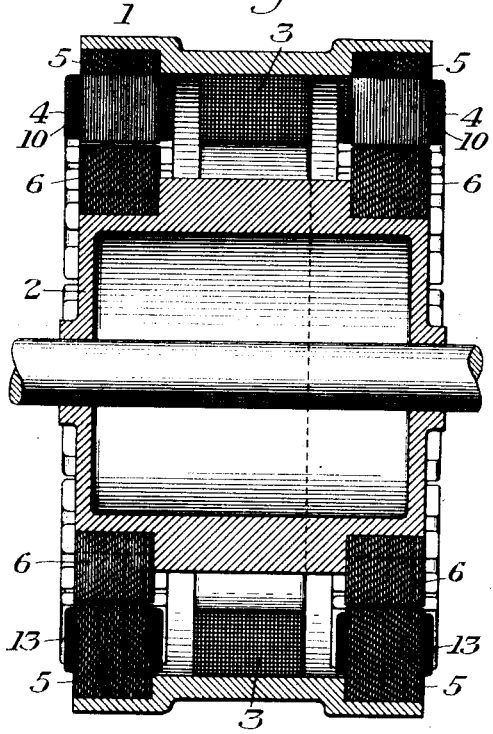
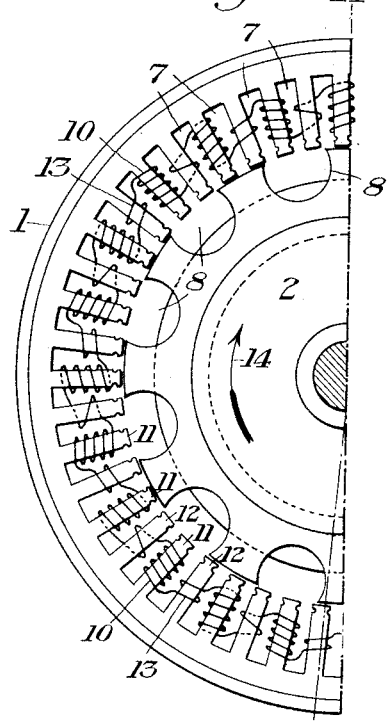
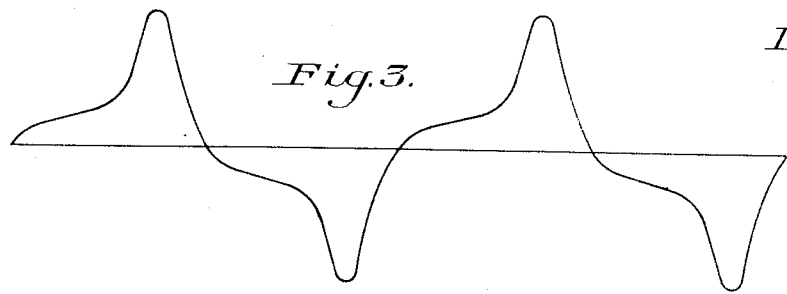
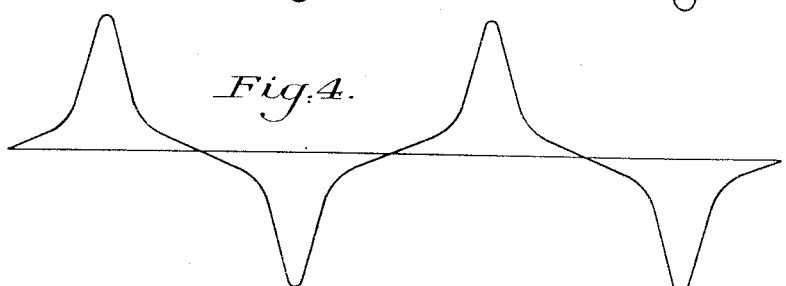
WITNESSES
INVENTOR Patented Nov. 14, 1922.

1,435,813

UNITED STATES PATENT OFFICE.

FULTON CUTTING, OF TUXEDO PARK, NEW YORK, AND BOWDEN WASHINGTON, OF CAMBRIDGE, MASSACHUSETTS.

ALTERNATING-CURRENT GENERATOR.

Application filed June 26, 1918. Serial No. 242,073.

*To all whom it may concern:*

Be it known that we, FULTON CUTTING and BOWDEN WASHINGTON, both citizens of the United States, and residents, respectively, of Tuxedo Park, Orange County, New York, and Cambridge, Middlesex County, Massachusetts, have invented a new and useful Improvement in Alternating-Current Generators, of which the following is a full, clear, and exact description, reference being had to the accompanying drawings, forming part of this specification, in which—

Figure 1 is an end elevation illustrating the stator and the rotor teeth, the winding coils being removed, and a few turns diagrammatically indicated on some of the teeth.

Figure 2 is a vertical section taken longitudinally through the machine along the line II—II of Figure 1, and Figures 3 and 4 are diagrams illustrating respectively the no load voltage wave and the current wave under load conditions.

The present invention relates to alternating current generators and particularly to an alternating current generator for use in wireless telegraphy, although the generator may be used for other purposes.

The generator is so constructed that it furnishes an alternating current having the peaks of its waves separated by periods during which there is substantially no current flow. A current of this character is particularly desirable in the system of radio telegraphy described in our co-pending application, Serial No. 134,812, filed December 4, 1916.

The alternators employed for wireless telegraphy are usually five hundred cycle alternators. In our system, described in our co-pending application above mentioned, the alternator feeds a condenser which charges and discharges from about six to twenty times per current alternation, and by current alternation is meant one-half of a complete cycle. It is found that if an alternator is designed to give a sharply peaked wave on no load voltage, this wave shape will not be fully maintained under the usual load conditions, and that the periods of inactivity between the wave peaks are smaller than might be expected from a consideration of the no load voltage wave. The load current wave is flattened out as compared with the no load voltage wave. The reason is believed to be as follows:— The circuits contain considerable inductance, particularly the inductance of the alternator itself. This inductance tends to smooth out the current wave. As the electromotive force developed by the alternator rises, the current starts to flow but lags behind the electromotive force. When the electromotive force has passed through its maximum and has decreased to zero, the current still continues to flow by virtue of the inductance. The effect is a broadening out of of the current wave. The energy is stored in a magnetic circuit of the alternator and this energy is not dissipated quickly enough to permit the current to follow accurately the induced electromotive force.

The alternator herein described is so constructed that there is a transfer of the magnetic energy to the mechanical energy of the rotor at a time when the energy is not wanted in the armature. By this means, the current wave is prevented from being broadened out, and a current is generated which even under load conditions has sharp peaks separated by considerable periods of inactivity. This is accomplished preferably by the differentially wound supplemental windings carried by interpoles, that is, poles located between the main poles of the alternator.

In the illustrated embodiment of the invention, the stator is indicated generally by reference numeral 1, and the rotor by the reference numeral 2. The illustrated machine is of the stationary armature, rotary field type. The field coil 3 is carried on the stationary part of the machine and is indicated in cross section in Figure 2, the machine being of the well known inductor type. The armature windings 4 are carried on the stator teeth 5, which are built up of the usual laminated sheet iron construction. Cooperating with the stator teeth 5, are rotor teeth 6 also of the usual laminated sheet iron construction. There are four times as many stator teeth as there are rotor teeth. A rotor tooth overlaps two stator teeth 5 and the intervening slots 7 of the stator, while a slot 8 of the rotor overlaps two teeth and two slots of the stator. Every alternate tooth of the stator carries one of the main armature coils indicated at 10 in Figure 1, such teeth constituting the main poles 11 of the machine. The intervening teeth constitute interpoles 12 which carry differential windings 13. The direction of winding is illustrated diagrammatically in Figure 1. The direction of rotation of the rotor is indicated by the arrow 14.

The interpoles are so wound as to produce an electromotive force at a time midway between the peaks of the current waves, and in a direction opposite in sign to the preceding wave peak. The alternating no load voltage wave produced by the modifying action of the interpoles is indicated in a general way in Figure 3. The wave is unsymmetrical. The interpoles cause a quick drop in voltage after the voltage wave peak and also give a preliminary boost to the next succeeding wave. The effect on the current when the load is thrown on the machine, is indicated in a general way in Figure 4. The action on the interpoles is to neutralize the effect of the inductance and to produce sharp wave peaks separated by considerable periods of substantially no current flow. The interpole voltage tends to cut off the tail of the preceding current wave and preliminarily boost the succeeding current wave. This approximates the ideal wave shape for use in our system of wireless telegraphy described in our co-pending application above mentioned. The strength of the interpoles can be adjusted to a proper value by suitably proportioning the windings on the interpoles to the windings on the main poles. Care must be taken, however, that the voltage of the interpoles is not high enough to fully reverse the current and start the transmitter gap prematurely discharging in the succeeding phase. In practice it has been found that the differential windings on the interpoles should have from twenty-five to thirty per cent of the number of turns on the main poles. The interpoles should be just about strong enough to absorb the surplus energy existing when the proper duration of the discharges at the transmitter gap has elasped and convert it into the mechanical energy of the rotor, and at the same time the interpoles should not be strong enough to cause premature gap discharges at the beginning of the next alternation or phase.

The main poles and their windings impress on the output circuit of the generator a symmetrical alternating voltage. The interpoles and their windings also impress on the output circuit a symmetrical alternating voltage, which is, however, less than the voltage impressed on the output circuit by the main poles and windings, and leading it by approximately 90°. These two symmetrical out-of-phase alternating voltages combine into a resultant unsymmetrical voltage wave as indicated in Figure 3.

While the preferred embodiment of the present invention has been illustrated and described, it must be understood that the invention is not limited to its preferred embodiment but may be embodied in other structures within the scope of the following claims.

We claim:

1. An alternating current generator having main poles and their windings for impressing on the output circuit of the generator a symmetrical, sharply peaked alternating voltage, and interpoles and their windings located between the main poles and excited from the same source as the main pole windings for impressing on the output circuit a symmetrical alternating voltage less than that produced by the main poles and windings but leading it by approximately 90° so as to produce a resultant unsymmetrical voltage wave which falls from its peak to zero value considerably more rapidly than it rises from its zero value to its peak, substantially as described.

2. An alternating current generator having main poles and their windings for impressing on the output circuit of the generator an alternating voltage, and interpoles and their windings located between the main poles and excited from the same source as the main pole windings for impressing on the output circuit an alternating voltage less than that produced by the main poles and windings but leading it so as to produce a resultant voltage wave which falls from its peak to zero value considerably more rapidly than it rises from its zero value to its peak, substantially as described.

3. An alternating current generator having main poles and their windings and interpoles between the main poles and having their windings in series with the main pole windings and having fewer winding turns than the main pole windings, each interpole being wound in a direction opposite to the next preceding main pole, substantially as described.

4. An alternating current generator having an output circuit, means for impressing on said circuit a main alternating voltage having a sharply peaked wave shape, and means for impressing on said circuit a secondary alternating voltage less than and leading the main voltage, so as to impress on said circuit a resultant unsymmetrical alternating voltage wave which falls from its peak to its zero value more rapidly than it rises from its zero value to its peak, substantially as described.

5. An alternating current generator having opposing relatively movable armature and field poles, the armature having four times as many polar projections as the field, and every other armature polar projection having fewer effective winding turns than the armature poles at each side of it, substantially as described.

6. An alternating current generator having opposing relatively movable armature and field poles, the armature having four times as many polar projections as the field, and every other armature polar projection having fewer effective winding turns than the armature poles at each side of it and wound in a direction opposite to the next preceding pole, substantially as described.

In testimony whereof, we have hereunto set our hand.

FULTON CUTTING.
BOWDEN WASHINGTON.